(12) United States Patent
Finster et al.

(10) Patent No.: US 9,307,290 B1
(45) Date of Patent: Apr. 5, 2016

(54) INCREASED USER EFFICIENCY AND INTERACTION PERFORMANCE THROUGH USER-TARGETED ELECTRONIC PROGRAM GUIDE CONTENT DESCRIPTIONS

(71) Applicant: Microsoft Technology Licensing, LLC, Redmond, WA (US)

(72) Inventors: Diana Finster, Seattle, WA (US); Adrian Chiu, Bellevue, WA (US); Enrique de la Garza, Sammamish, WA (US); Alexei Pineda, Sammamish, WA (US); Donald Keller, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/550,909

(22) Filed: Nov. 21, 2014

(51) Int. Cl.
*G06F 3/00* (2006.01)
*H04N 21/466* (2011.01)
*H04N 21/431* (2011.01)
*H04N 21/435* (2011.01)
(Continued)

(52) U.S. Cl.
CPC ......... *H04N 21/4667* (2013.01); *H04N 21/431* (2013.01); *H04N 21/435* (2013.01); *H04N 21/44222* (2013.01); *H04N 21/4532* (2013.01); *H04N 21/462* (2013.01); *H04N 21/4821* (2013.01); *H04N 21/8133* (2013.01); *H04N 21/84* (2013.01)

(58) Field of Classification Search
CPC ................................. H04N 21/4352
USPC ....................................... 725/46–48
See application file for complete search history.

(56) References Cited

U.S. PATENT DOCUMENTS 6,539,548 B1 * 3/2003 Hendricks ............... H04N 20/42
   348/E5.002
8,898,705 B2 * 11/2014 Melnychenko ...... H04N 21/482
   725/115

(Continued)

FOREIGN PATENT DOCUMENTS

WO    2014033284 A1    3/2014

OTHER PUBLICATIONS

Lee, et al., "Personalized Contents Guide and Browsing based on User Preference", In Proceedings of the 2nd Workshop on Personalization in Future TV, May 28, 2002, 10 pages.

(Continued)

*Primary Examiner* — Olugbenga Idowu
(74) *Attorney, Agent, or Firm* — Dave Ream; Tom Wong; Micky Minhas

(57) ABSTRACT

Electronic program guide descriptions, of content referenced by the electronic program guide, are user-targeted based on user data. Such user-targeted electronic program guide descriptions aid users in identifying desirable content, thereby increasing user interaction performance with a content presentation device providing such user-targeted electronic program guide descriptions. To generate user-targeted electronic program guide descriptions, received electronic program guide information includes different, alternative or mutually exclusive, content descriptions of a given content item. Such electronic program guide information is compared with the user data and user-targeted content item descriptions is generated from the different content descriptions. A visual electronic program guide, including the user-targeted content item description, is displayed to a user on a physical display device.

20 Claims, 7 Drawing Sheets

(51) Int. Cl.
*H04N 21/442* (2011.01)
*H04N 21/45* (2011.01)
*H04N 21/462* (2011.01)
*H04N 21/482* (2011.01)
*H04N 21/84* (2011.01)
*H04N 21/81* (2011.01)

(56) References Cited

U.S. PATENT DOCUMENTS 8,910,210 B2 * 12/2014 Lee .................. H04N 5/44543
 725/39
2002/0133821 A1 9/2002 Shteyn
2003/0101449 A1 5/2003 Bentolila et al.
2004/0073923 A1 4/2004 Wasserman
2004/0123318 A1 6/2004 Lee et al.
2006/0155850 A1 7/2006 Ma et al.
2011/0302610 A1 12/2011 Karaoguz et al.

OTHER PUBLICATIONS

Gena, Cristina, "Designing TV Viewer Stereotypes for an Electronic Program Guide", In Proceedings of the 8th International Conference on User Modeling, Jul. 13, 2001, 3 pages.

Uchyigit, et al., "A Personalised Multi-Modal Electronic Program Guide", In Proceedings of European Conference on Interactive Television, Apr. 2, 2003, 7 pages.

* cited by examiner

INCREASED USER EFFICIENCY AND INTERACTION PERFORMANCE THROUGH USER-TARGETED ELECTRONIC PROGRAM GUIDE CONTENT DESCRIPTIONS

BACKGROUND

Audio and visual content, such as shows, movies and video games, that are selected by individuals are often selected based upon information provided through electronic program guides. For example, cable boxes, video game consoles, tablet computing devices, and other content presentation devices can display an electronic program guide that provides summary information about content that can be accessed by users. The users of such content presentation devices can then navigate through the available content to find content that they are interested in consuming, such as movies or television shows they want to watch, games they want to play, applications they want to install, and other content they would like to consume. To aid users in determining whether a given content item is desirable to them, an electronic program can include summary information such as a plot outline, a game description, a genre of a show, an identification of sports teams that are playing each other, actors in a movie, and other content descriptions.

Electronic program guide information can be generated by each individual content provider. Thus, for example, a movie studio can generate a summary of a movie produced by that studio, as well as providing factual information about the movie, such as its runtime, the lead actors, and other like information. Electronic program guide information can also be generated by intermediate entities, such as a movie distributor or a television station. A provider of an electronic program guide can then aggregate such information from multiple different sources into a single electronic program guide that can provide information regarding content sourced from multiple different content providers and distributors.

However, electronic program guide information is generalized and universal in that each viewer of an electronic program guide is presented with the same information about the content identified by the electronic program guide. As one example, each user accessing an electronic program guide will be presented with the same generalized description for a specific movie that is referenced by the electronic program guide. Users, therefore, can miss out on content that they would have enjoyed because the electronic program guide description of such content was overly generalized, thereby causing the user to misidentify or misunderstand the content being offered and, ultimately, causing the user to choose to not consume that content.

SUMMARY

Electronic program guide descriptions, of content listed by the electronic program guide, can be user-targeted based on explicitly indicated or implicitly derived user preferences or other user data. Such user-targeted electronic program guide descriptions aid users in identifying desirable content, thereby increasing user interaction performance, such as user engagement, with a content presentation device providing such user-targeted electronic program guide descriptions. Because the electronic program guide descriptions can be targeted to individual users, those users can more quickly locate and identify desirable content, thereby increasing user efficiency and, again, driving user engagement. Furthermore, because user-targeted electronic program guide descriptions can increase user efficiency and consumption of the content associated with such user-targeted descriptions, and can drive user engagement with such content, content producers and distributors can be desirous of user-targeted descriptions being provided for their content, can be willing, therefore, to facilitate and incentivize the generation and provision of user-targeted descriptions. To generate user-targeted electronic program guide descriptions, received electronic program guide information can include different, alternative or mutually exclusive, content descriptions of a given content item. Such electronic program guide information can be compared with the user data, and user-targeted content item descriptions can be generated from the different content descriptions. A visual electronic program guide, including the user-targeted content item description, can be displayed to a user on a physical display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
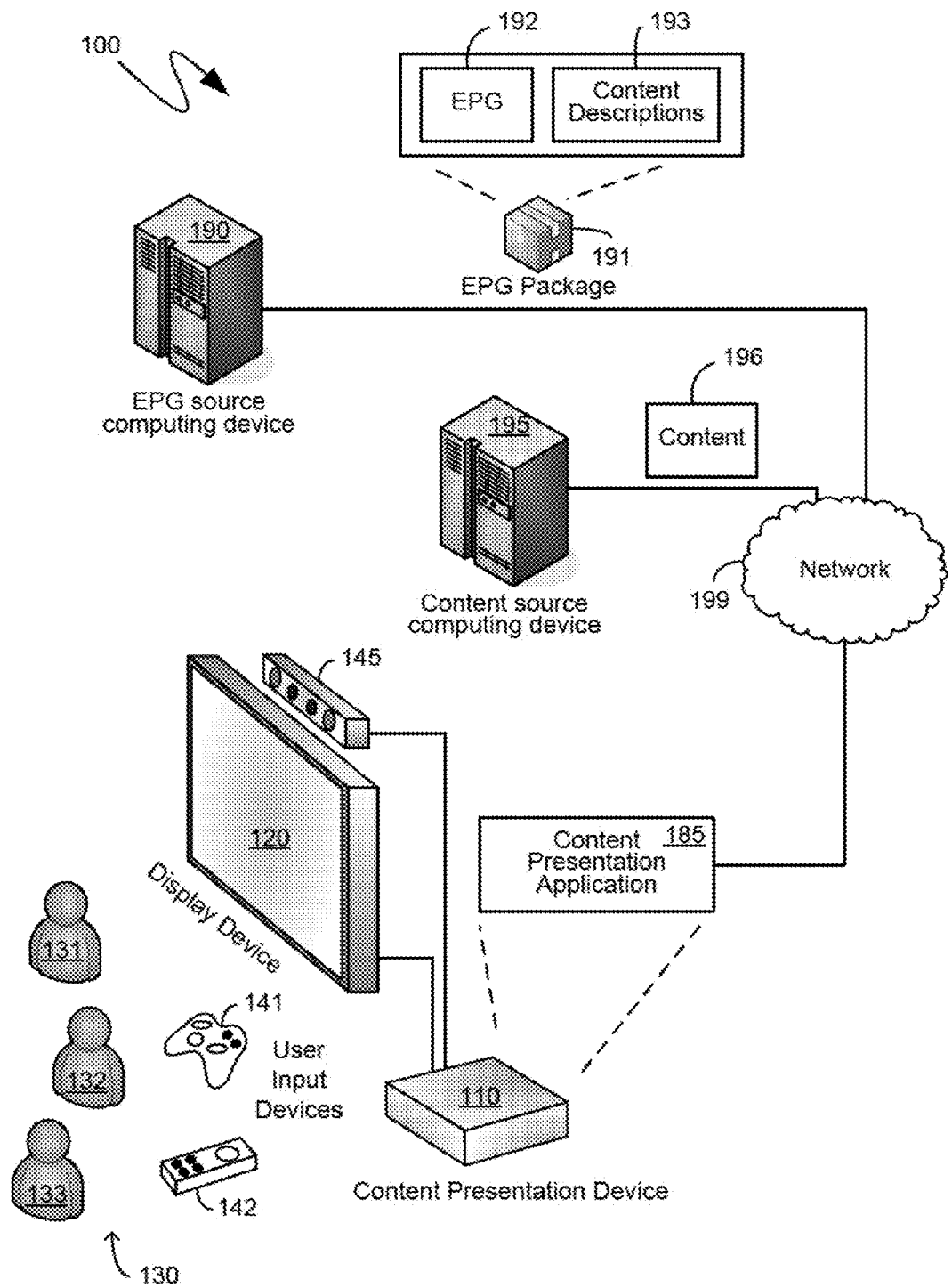
FIG. 1 is a block diagram of an exemplary system for generating user-targeted electronic program guide descriptions.

The following description relates to both increasing the efficiency with which users identify content to consume and also increasing user interaction performance, such as user engagement with content through a content presentation device, by providing user-targeted electronic program guide descriptions on a physical display device that is communicationally coupled to the content presentation device on which a content presentation application executes and presents content to users through the physical rendering of such content on the physical display device. Electronic program guide content information can include different, alternative, or mutually exclusive, content descriptions of a given content item. Then, the electronic program guide content information can be compared with the user data. A user-targeted content item description can be generated from the different, alternative or mutually exclusive content descriptions of the given content item based on comparing the electronic program guide content information with the user data. Then, a visual electronic program guide including the user-targeted content item description can be displayed to a user on a physical display device. Because the electronic program guide descriptions can be targeted to individual users, those users can more quickly locate and identify desirable content, thereby increasing user efficiency and, again, driving user engagement. Furthermore, because user-targeted electronic program guide descriptions can increase user efficiency and consumption of the content associated with such user-targeted descriptions, and can drive user engagement with such content, content producers and distributors can be desirous of user-targeted descriptions being provided for their content, can be willing, therefore, to facilitate and incentivize the generation and provision of user-targeted descriptions.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other devices capable of executing the computer-executable instructions in the manner intended to produce the desired results, including hand-held devices, multi-processor systems, microprocessor based or programmable consumer electronics, network PCs, minicomputers, mainframe computers, video game consoles, digital video recorders, audio and/or video content presentation devices and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-Specific Standard Products (ASSPs), System-on-a-Chip systems (SOCs), Complex Programmable Logic Devices (CPLDs), and other like hardware logic components and devices.

Turning to FIG. 1, an exemplary system 100 is illustrated, providing context for the descriptions below. As illustrated in FIG. 1, the exemplary system 100 can comprise a content presentation device 110 that can be communicationally coupled to a physical display device 120. The physical display device 120 can be any type of display device, including Liquid Crystal Display (LCD) devices, plasma-based devices, Organic Light Emitting Diode (OLED) devices, phosphorus-based devices, projector devices, touch screen devices, and other display devices that can generate a viewable physical image. As will be recognized by those skilled in the art, such display devices generate images through the manipulation of discrete, physical elements that, in aggregate, comprise the image being presented by the display device. For example, an LCD-based device generates images through the physical orientation of individual, physical liquid crystals, which, in aggregate, form the image being presented by the LCD-based device.

The content presentation device 110 can be any device having sufficient processing capability to execute the computer-executable instructions, and perform the steps, described herein. For example, the content presentation device 110 can be a video game console, a streaming media device, a digital video recorder, a set-top box provided by a content or network provider, or any of the above-enumerated computing devices. The content presentation device 110 can further comprise sufficient hardware and software capability to control a display device, such as the display device 120, in order to cause the display device 120 to generate images thereon. One or more users, such as the users 131, 132 and 133, collectively referred to as the users 130, can utilize the content presentation device 110 to consume content displayed by the content presentation device 110 via the physical display device 120. The users 130 can interface with the content presentation device 110 through various user input devices including, for example, a conventional remote control 142, a video game controller 141, an audio/visual input device 145, as well as more traditional computer input devices, such as a trackpad, a mouse, keyboard, and other user input devices, which are not explicitly illustrated in the exemplary system 100 shown in FIG. 1. As will be recognized by those skilled in the art, the audio/visual input device 145 can comprise sensors by which the physical appearance and physical movements of the user, as well as audio generated by the user, can be utilized to provide user input, such as to the content presentation device 110.

The content presentation device 110 can display, on the display device 120, content that can be consumed by multiple users, such as the users 130, simultaneously. In such instances, only some of the users 130 may be actively controlling the content presentation device 110, while others of the users 130 may be merely viewing the content being generated on the physical display device 120. Consequently, as utilized herein, the term "user" means any individual that consumes content presented by a device, irrespective of whether such an individual is actively controlling the device, or the content presented thereby, or is merely consuming the content without active control.

The content presentation device 110 can be communicationally coupled with a network 199, through which the content presentation device 110 can obtain content to display to the users 130. To allow the users 130 to find content that they may seek to consume, the content presentation device 110 can display an electronic program guide. The electronic program guide can provide the users 130 with updated tables, images, frames, or other like organizations displaying information regarding current and upcoming content, including television shows, radio broadcasts, video on demand content, streaming video content, games, media, applications, and other forms of content. The electronic program guide can enable interactive navigation by the users 130, thereby facilitating the users' review of content by time, title, station, genre, or other categories and fields. The users 130 can interact with the electronic program guide by way of an input device, such as the input devices 141, 142, or 145.

While a user is interacting with the electronic program guide and navigating through the information provided therein, the guide can display content descriptions for the various content being referenced by that portion of the electronic program guide that is currently being displayed on the physical display device 120. For example, content descriptions can appear next to the titles of content or in dedicated content description boxes, frames, or other like visual delineations. As another example, while the user is interacting with the guide, or when the user selects a specific content item in the guide, additional information can be presented with the selected content being given a greater portion of the display area of the physical display device 120 within which to present such additional information. The additional information can comprise the above-referenced content descriptions, either in summary form, or in greater detail than that available through the electronic program guide prior to the user's selection of such a specific content item. For example, such greater detail can include plot summaries, a listing of actors, content item genres, and other information relevant to a content item. The information presented by an electronic program guide is typically utilized by the users 130 to make decisions about which content items they will consume. As indicated previously, however, traditional electronic program guides display generalized and universal information, such that the description, provided by an electronic program guide, for any given content, is the same for all users. Because users utilize electronic program guide information to identify content items to consume, generalized descriptions can cause at least some users to misidentify or misunderstand the content being offered and, ultimately, cause them to choose to not consume that content even though such users would have enjoyed consuming such content. By contrast, if the descriptions provided by an electronic program guide could be target or personalized for individual users, those users would be able to more easily and more effectively identify content that they would like to consume. Such an improvement would increase user interaction with content presentation device 110, increase user enjoyment in the consumption of content through the content presentation device 110, increase user efficiency in identifying such user-enjoyable content, and increase user engagement with both the content presentation device 110, the content presentation application 185, and the electronic program guide.

According to one aspect, an electronic program guide, such as that displayed to the users 130 on the display device 120, can be generated by the content presentation device 110 using scheduling data sent by cable or satellite providers, movie subscription services, centralized scheduling information providers, and other electronic program guide information sources. Such sources can use a server, such as the electronic program guide source computing device 190, to transmit an electronic program guide to the content presentation device 110. For example, the electronic program guide source computing device 190 can send electronic program guide information 192 and content descriptions 193 in an electronic program guide package 191 over the network 199 to the content presentation device 110 and the content presentation device 110 can generate a displayed electronic program guide based on information in the electronic program guide package 191. Although illustrated separately, the electronic program guide information 192 and content descriptions 193 can also be a singular set of data, and their illustration as separate entities is for descriptive and illustrative simplicity only.

According to another aspect, portions of the electronic program guide 192 and the content descriptions 193 can be provided by different sources and can be aggregated by the content presentation device 110 or by another computing device on behalf of the content presentation device 110, such as, for example, the electronic program guide source computing device 190. For example, a content source, using the content source computing device 195, can generate content descriptions and provide them separately or along with the corresponding content 196. Such content descriptions can be individually provided, such as from multiple different content sources, to the content presentation device 110, which can then aggregate such individually provided content descriptions into a single electronic program guide. Alternatively, or in addition, such content descriptions can be provided to the electronic program guide source computing device 190 and the electronic program guide source computing device 190 can aggregate them into an electronic program guide, which can then be transmitted to the content presentation device, such as part of the electronic program guide package 191.

According to one aspect, the content presentation device 110 can have executing thereon a content presentation application 185 that can include computer-executable instructions which, when executed by at least some of the processing units of the content presentation device 110, can cause the content presentation device 110 to perform the steps described in the disclosed mechanisms. One such step can comprise the display of an electronic program guide on the physical display device 120, thereby causing the physical display device 120 to physically render images comprising such an electronic program guide.

To generate a user-targeted electronic program guide, the content presentation device 110 can store user data. To protect users' privacy, users would be required to take one or more affirmative actions before their personal information could be collected and stored, and, in the absence of such affirmative action, their personal information would not be collected. From the users' perspective, there can be meaningful benefits to allowing access to some discrete portion of their personal information. For example, users may allow access to personal information simply because they desire more targeted electronic program guide information. As another example, users can be provided with additional services, or benefits, in exchange for providing, or allowing access to, some of their personal information. As yet another example, users can be compensated, either monetarily or through products and services, in exchange for providing, or allowing access to, some of their personal information.

As indicated previously, user-targeted electronic program guide information can provide numerous user benefits. Most evidently, users will more efficiently and more accurately identify content that will be of interest to them. As such, users will consume more content that they enjoy and will less often miss out on such content. User-targeted electronic program guide information, therefore, increases user engagement, with the content itself, with a content presentation device, such as the exemplary content presentation device 110, and with one or more content presentation applications, such as the exemplary content presentation application 185. Additionally, increased user content consumption results in increased benefits to content authors or creators, content providers, content distributors, and the providers and aggregators of electronic program guide information. For example, increased user content consumption results in greater advertising revenue, greater licensing payments, and other benefits.

According to one aspect, the received electronic program guide content information can include different, alternative or mutually exclusive, content descriptions of a given content item. The content presentation device 110 can compare the electronic program guide content information with the user data, and, from such a comparison, the content presentation device 110 can generate a user-targeted content item description from the different, alternative content descriptions of the given content item. For example, the content presentation device 110 can select at least one of the alternative content descriptions for at least part of the user-targeted content item description if information in the user data indicates a user is a certain type of user that matches a category in the electronic program guide content information corresponding to the selected alternative content description. The content presentation device 110 can then display, to such a user, a visual electronic program guide including the user-targeted content item description on the physical display device 120.

The generation of user-targeted content item descriptions, which will be described in further detail below, can be generated by the content presentation device 110, such as by executing, on one or more processing units of the content presentation device 110, a content presentation application 185, Alternatively, or in addition, such user-targeted content item descriptions can be generated by an electronic program guide information server, represented in FIG. 1 by the electronic program guide source computing device 190, again through the execution of computer-executable instructions by one or more processing units of the electronic program guide source computing device 190. More specifically, the electronic program guide source computing device 190 can include one or more processing units that execute computer-executable instructions and can also include a network interface that communicationally couples the electronic program guide source computing device 190 to the content presentation device 110 such that the content presentation device 110 causes physical changes to the physical display device 120, generating display content thereon. Different, alternative, mutually exclusive, content descriptions can be received by the electronic program guide source computing device 190. For example, the electronic program guide source computing device 190 can receive such descriptions from one or more human generators thereof, such as users of the electronic program guide source computing device 190 that are assigned the task of generating such different, alternative, mutually exclusive, content descriptions and tagging, or otherwise categorizing, them as appropriate.

As another example, the electronic program guide source computing device 190 can receive the different, alternative, mutually exclusive, content descriptions from one or more users of the content source computing device 195. Upon receiving different, alternative content descriptions, the electronic program guide source computing device 190 can generate an electronic program guide content information database of different, alternative content descriptions including the different content descriptions for the content description category. The electronic program guide source computing device 190 can then provide the electronic program guide content information to the content presentation device 110 to display an electronic program guide, having user-targeted content descriptions, on the physical display device 120.

More specifically, a user, such as the user 131, can view, using the content presentation device 110, an electronic program guide for a cable provider, a marketplace, a store, a media application, or other content source. The content presentation application 185 can have access to user data including, for example, user profile information, prior user purchases, explicitly indicated user preferences, prior reviews the user generated regarding previously consumed content, and other like user information. Rather than generating the same description for a content item that will be provided to every user, the content presentation application 185 can generate user-targeted content descriptions from the alternative content descriptions obtained and based on the user data.

According to one aspect, an electronic program guide source computing device 190 can send an electronic program guide 192 and electronic program guide content descriptions 193, which can include different, alternative descriptions of one or more content items, to the content presentation device 110. The electronic program guide 192 and the content descriptions 193 can be sent in a package 191 or can be sent separately from the electronic program guide source computing device 190 or separately from different source devices.

An electronic program guide source can initially provide the different, alternative descriptions of particular content items. For example, a content provider can interact with the content source computing device 195 to generate and make available content 196, as well as descriptions of such content, which can include the aforementioned different, alternative descriptions. Content providers can include television content providers, movie content providers, application content providers, music content providers and other like content providers. The electronic program guide content information can include content duration information, genre information, actor information, rating information, director information, producer information, source information, and other content information that can be separate from or included in different, alternative content descriptions 193. The different, alternative descriptions 193 can include some or all of the aforementioned content information.

The content presentation application 185, executing on the content presentation device 110, can include an interpretation layer that can parse through the different, alternative, and mutually exclusive, content descriptions to select content descriptions that are targeted to a specific user based on such a user's data. The content presentation device 110 can then display the relevant content descriptions as user-targeted content item descriptions in an electronic program guide displayed on the display device 120.

In such a manner, alternate, different and targeted, content descriptions can be displayed to diverse users. The users can then become more engaged, and have higher interaction performance, with descriptions that are customized and targeted to individual users or groups of users based on their preferences. Content providers can provide the different content descriptions through a service provider, directly to the content presentation device 110, through an application on the content presentation device 110, through an intermediary content description service, through an electronic program guide service, or otherwise to a user through the content presentation device 110. Then, for example, when a user 131 is viewing the electronic program guide being presented by the content presentation application 185, the user 131 can see descriptions that are customized based on the user's preferences. As indicated, user-targeted electronic program guide information provides a benefit to the user 131 because the user 131 will see descriptions that are more relevant to the user's tastes. This also provides a benefit to content providers because the user 131 will be more likely to engage with, and more likely to select, content that has a description tailored to the user's tastes. Thus, the system 100 can provide the ability to update content descriptions in an electronic program guide based on user information including user behavior, user profile, user location, a current time, and other user information.

In some instances, the content presentation device 110 can monitor user access of content items after displaying the user-targeted content item descriptions corresponding to the content items. The content presentation device 110 can then produce information reflecting an amount of user access of content items with user-targeted content item descriptions. The produced information can, optionally, be sent back to content description providers. For example, the content presentation device 110, or a device receiving content access information from multiple content presentation devices, can determine whether the use of user-targeted content item descriptions for different types of content results in more user access of the content. Such determinations can then be provided to content description providers and content providers, thereby enabling the content description providers to identify which types of user-targeted content item descriptions encourage users to access, access otherwise interact with, the corresponding content. As such information can be of use to content description providers, it can be sold or otherwise provided for monetary or other benefit.

Aspects of the above-described provision of user-targeted content item descriptions can be performed on a remote server computing device, on a local computing device, or combinations thereof. For example, descriptions and/or a complete electronic program guide can be generated and/or stored at a server, at a local computing device, or at a combination of the two. Additionally, user data can be stored on a remote server, on a local computing device, or distributed between both. As a more specific example, a user's purchase history can be stored at a server and descriptions can be adjusted based on the purchase history. A user could even choose which information should be stored locally on a device, or remotely on a server, based on the user's preferences. Remote storage can also be used to provide operation at different locations and on different devices. Local storage can also be used for speed of access or when a user's network connection is down.

Figure 2:
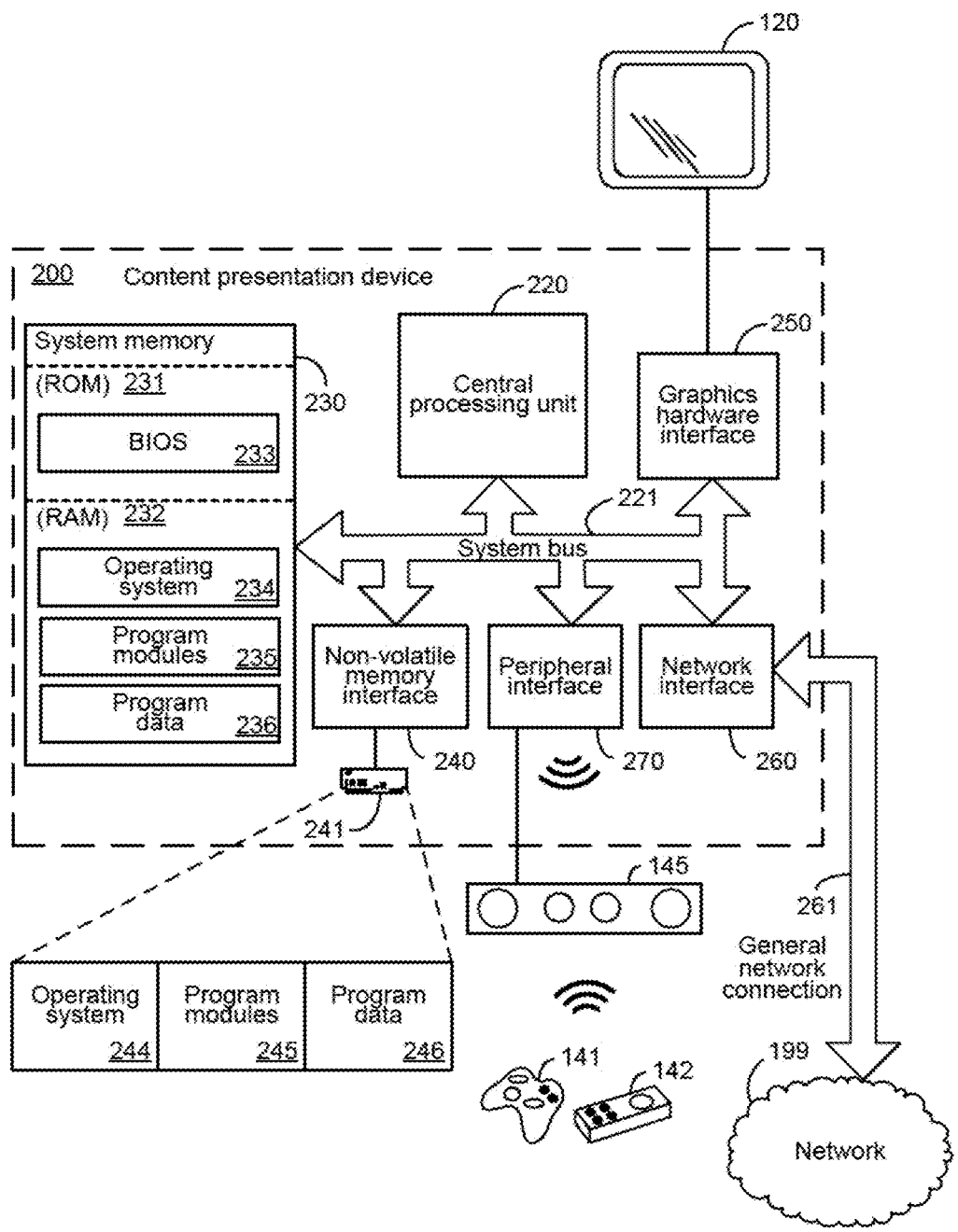
FIG. 2 is a block diagram of an exemplary content presentation device.

Before proceeding with further descriptions of the aforementioned mechanisms, reference is made to FIG. 2, wherein an exemplary content presentation device 200 is illustrated, which can perform some or all of the mechanisms described herein. The exemplary content presentation device 200 can include, but is not limited to, one or more Central Processing Units (CPUs) 220, a system memory 230, and a system bus 221 that couples various system components including the system memory to the processing unit 220. The one or more CPUs 220 can execute computer-executable instructions. The system bus 221 may be any of several types of bus structures including a memory bus or memory controller, a peripheral bus, and a local bus using any of a variety of bus architectures. The content presentation device 200 can include graphics hardware, including, but not limited to, a graphics hardware interface 250 and the display device 120, described previously. For example, the graphics hardware interface 250 can communicationally couple the content presentation device 200 to the physical display device 120 such that the computer-executable instructions being executed by the one or more CPUs 220 cause physical changes to the physical display device 120, thereby generating display content on the physical display device 120.

Depending on the specific physical implementation, one or more of the CPUs 220, the system memory 230 and other components of the content presentation device 200 can be physically co-located, such as on a single chip. In such a case, some or all of the system bus 221 can be nothing more than silicon pathways within a single chip structure and its illustration in FIG. 2 can be nothing more than notational convenience for the purpose of illustration.

The content presentation device 200 also typically includes computer readable media, which can include any available media that can be accessed by content presentation device 200 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the content presentation device 200. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, Radio Frequency (RF), infrared and other wireless media. Combinations of the any of the above should also be included within the scope of computer readable media.

The system memory 230 includes computer storage media in the form of volatile and/or nonvolatile memory such as Read Only Memory (ROM) 231 and Random Access Memory (RAM) 232. A Basic Input/Output System 233 (BIOS), containing the basic routines that help to transfer information between elements within content presentation device 200, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, other program modules 235, and program data 236.

The content presentation device 200 may also include other removable/non-removable, volatile/nonvolatile computer storage media. By way of example only, FIG. 2 illustrates a hard disk drive 241 that reads from or writes to non-removable, nonvolatile magnetic media. Other removable/non-removable, volatile/nonvolatile computer storage media that can be used with the exemplary content presentation device include, but are not limited to, magnetic tape cassettes, flash memory cards, digital versatile disks, digital video tape, solid state RAM, solid state ROM, and the like. The hard disk drive 241 is typically connected to the system bus 221 through a non-volatile memory interface such as interface 240.

The drives and their associated computer storage media discussed above and illustrated in FIG. 2, provide storage of computer readable instructions, data structures, program modules and other data for the content presentation device 200. In FIG. 2, for example, hard disk drive 241 is illustrated as storing operating system 244, other program modules 245, and program data 246. Note that these components can either be the same as or different from operating system 234, other program modules 235 and program data 236. Operating system 244, other program modules 245 and program data 246 are given different numbers hereto illustrate that, at a minimum, they are different copies.

The content presentation device 200 may operate in a networked environment using logical connections to one or more remote computers. The content presentation device 200 is illustrated as being connected to the general network connection 261 through a network interface or adapter 260, which is, in turn, connected to the system bus 221. In a networked environment, program modules depicted relative to the content presentation device 200, or portions or peripherals thereof, may be stored in the memory of one or more computing devices that are communicatively coupled to the content presentation device 200 through the general network connection 261. For example, at least some of the program models 245 and program data 246 can be stored on computer-readable storage media remote from the content presentation device 200 and accessible by the content presentation device 200 over the network 199 via the general network connection 261 shown in FIG. 2. In such an instance, the relevant portions of the program modules 245 and/or program data 246 can be streamed or otherwise communicated in real-time or in pseudo-real-time to the content presentation device 200 to be executed and/or utilized thereby in the same manner as if such program modules 245 and/or program data 246 were stored on a local storage device of the content presentation device 200, such as, for example, the hard disk drive 241. It will be appreciated that the network connections shown are exemplary and other means of establishing a communications link between computing devices may be used.

Additionally, the content presentation device 200 can also include, or communicate with, user interface and input peripherals, including, but not limited to the game controller 141, the remote control 142 and the audio/video input device 145 that were described previously with reference to FIG. 1. Other types of input peripherals can equally be utilized, including more traditional computing device input peripherals, such as a keyboard, a trackpad, or a mouse. The display 120 can, itself, be an input peripheral capable of receiving touch-based user input, such as a touch-sensitive, or multi-touch capable, display device. Such input peripherals can be communicationally coupled to the system bus 121 via a peripheral interface 270. Such communicational couplings can be wired, as exemplarily illustrated in FIG. 2 with the wired connection between the peripheral interface 270 and the audio/video input device 145, or they can be wireless, as exemplarily illustrated in FIG. 2 with the wireless connection between the peripheral interface 270 and the game controller 141 and the remote control 142.

Although described as a single physical device, the exemplary content presentation device 200 can be a virtual content presentation device, in which case the functionality of the above-described physical components, such as the CPU 220, the system memory 230, the network interface 260, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary content presentation device 200 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "content presentation device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

Figure 3:
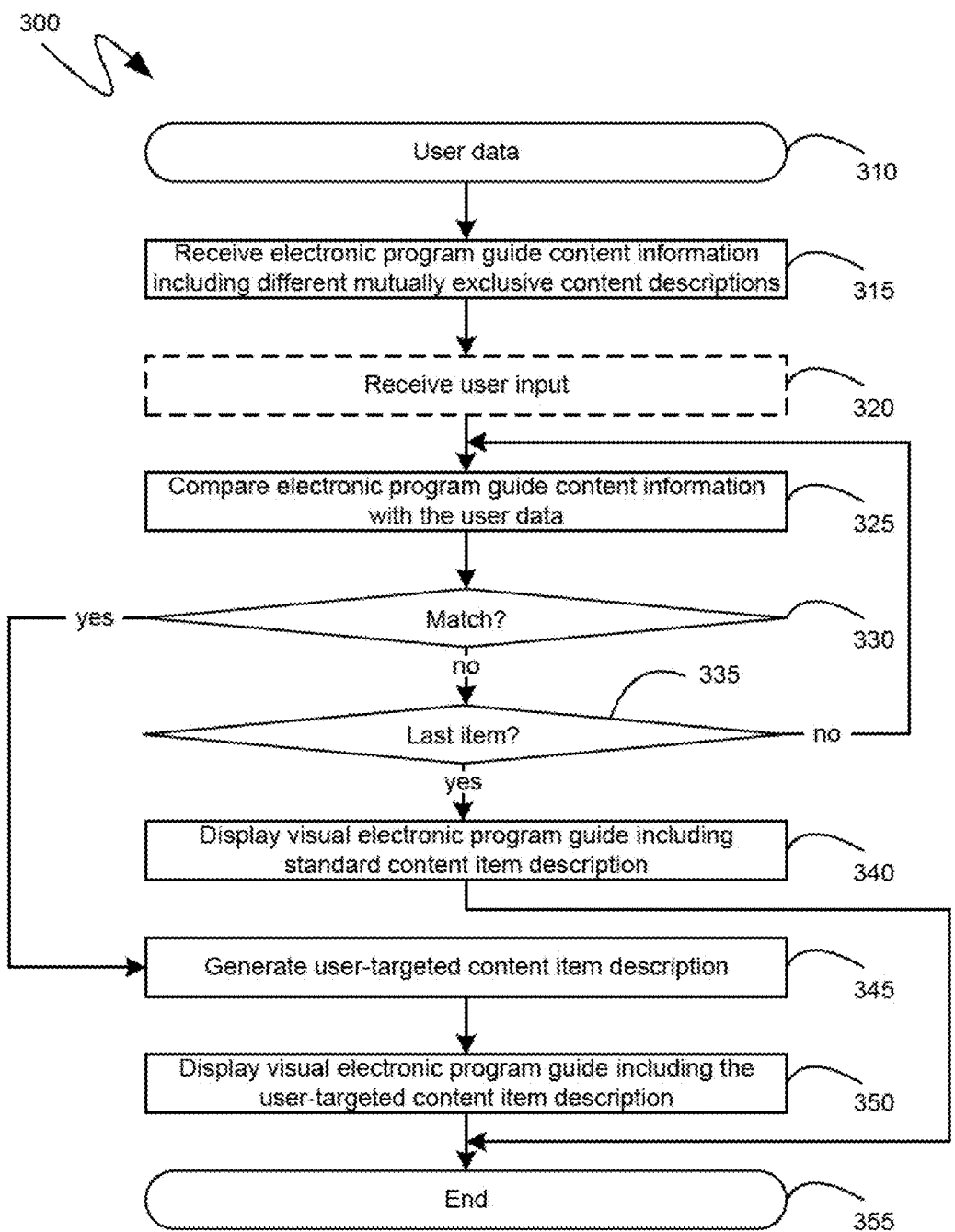
FIG. 3 is an exemplary flow diagram illustrating operation of a content presentation device for increasing user interaction performance.

Turning to FIG. 3, an exemplary flow diagram 300 is shown therein, illustrating an exemplary operation of a content presentation device, such as the content presentation device 200 (shown in FIG. 2), for increasing user efficiency and interaction performance. Initially, at step 310, user data can be accessed. User data can include user behavior data, user profile data, prior user actions, purchases or history, a current facial or body expression of the user, user biometric data, user demographic data, user genre preference data, user price preference data, user browsing history data, user game playing history data, user brand preference data, and other user data that can indicate a propensity of a user to prefer certain categories of content over others.

At step 315, electronic program guide content information can be received. The electronic program guide content information can include different, alternative content descriptions of a given content item. The different, alternative content descriptions can be provided in different description fields. For example, one description field can comprise a description of a given content item, and another, different field can comprise a description of that same content item, except that such a description can be written to emphasize different aspects, features, summaries, reviews or other like descriptive aspects of the content item. When the electronic program guide content information is received, it can be parsed to extract the different, alternative content descriptions of a given content item. Subsequently, as will be detailed below, at least one of each of the different, alternative content description can be correlated with at least one of the user preferences suggested by the user data. Alternately, or in addition, the electronic program guide content information can already indicate which descriptions correspond to which type of user categories they apply to.

The electronic program guide content information can also contain key words, phrases or other like metadata in the content information. For example, the content information can include genre descriptions, actor names, actor information, director or producer names, sports team names, and/or can include other information about a given content item. Furthermore, sets of content information can be provided with corresponding content, can be linked to specific content, can be retrieved from a service that provides the content information separate from the content, and can be other content information. The electronic program guide content information can be received by itself, with content, in the form of content metadata provided with an electronic program guide, or otherwise received.

By way of a specific, illustrative example, one alternative content description can comprise reference to a particular actor, such as "Garrison Gord", that stars in a corresponding content item, such as a movie. Continuing with the same illustrative example, another alternative content description can comprise reference to another actor, such as "Mary Misher", that also stars in the same content item. User content preference data can further reference specific actors, such as, for example, if the user has explicitly indicated a preference for watching movies with that actor, or, as another example, if the user's viewing history comprises a large number of, or a higher percentage of, that actors' movies. The user content preference can further be based on a number of times a user has watched movies with a given actor, a recent movie the user has watched with a given actor, a high rating a user gave a movie that starred a particular, actor, or other useful information that indicates a preference of a user. In the present illustrative example, the user content preference data can comprise information indicative of the user's preference for Garrison Gord movies. As a result, a generated user-targeted content item description can highlight the fact that Garrison Gord appears in the movie by, for example, utilizing the one of the alternative content descriptions that emphasizes Garrison Gord's role in the content as opposed to other actors who may also be associated with the content, such as, for example, Mary Misher in the present, illustrative example.

As another specific, illustrative example, one alternative content description can comprise reference to a genre of a movie as being an action movie. However, because an action movie can also include romantic aspects, for example, another, alternative content description can comprise reference to a genre of a movie as being a romance movie. User preference data can further reference specific genres of movies that are associated with the user, such as genres of movies that the user has recently viewed, genres of movies that the user has explicitly indicated that the user enjoyed, specific genres of movies that have been specified by the user, and other like user preference data regarding genres of content. In the present, illustrative example, such user preference data can indicative of a user preference for action genre movies. As a result, a generated user-targeted content item description can highlight the action aspects of a movie by, for example, utilizing the one of the alternative content descriptions that identifies the content as belonging to the action genre as opposed to other possible genres identified by alternative content descriptions of the dame content, such as, for example, the romance genre in the present, illustrative example.

Turning back to the flow diagram 300 of FIG. 3, at step 320, as an optional step, so illustrated by the dashed lines in FIG. 3, user input can be received that selects specific content on the visual electronic program guide. The user input can be received prior to subsequent steps, or may be received during or after the steps described below.

Alternatively, the user input, selecting a specific content item, can be independent of the steps described below and the mechanisms illustrated by the flow diagram 300 can be utilized to provide electronic program guide information where each item listed in the electronic program guide is described with user-targeted content item descriptions, to the extent available. Accordingly, the receipt of the user input, selecting a specific content item, at step 320 is illustrated as being optional.

At step 325, electronic program guide content information, including potentially different, alternative or mutually exclusive content item information, can be compared with available user data. For example, as detailed by the above examples, different content item description aspects can be compared with user content preferences or other relevant user data. At step 330, a determination can be made as to whether one or more of the different, alternative or mutually exclusive content item information, from the electronic program guide, aligns with, or matches, user data such that the aligned, or matched one or more of the alternative content item information should be utilized to generate the user-targeted content item description.

At step 335, if no match or alignment is found at step 330, processing can return to step 325 and further electronic program guide content information can be compared with user data so long as, at step 335, it is determined that further such electronic program guide content information remaining to be considered still remains. For example, a next description field information item of the description field information can be compared to a given first user preference when the previous description field information item does not match the given user preference. As another example, a next content item description can be evaluated if the processing of the flow diagram 300 is to proceed through some or all of the electronic program guide independently of any user selection of a specific content item. Once the electronic program guide content information has been evaluated, as identified at step 335, processing can proceed to step 340, where, if the user data does not match, or align with, any of the different, alternative or mutually exclusive content item descriptions provided for a given content item in the electronic program guide, a standard, or default, content item description, such as a generic content description that applies to all users, can be utilized and can be displayed to a user on a physical display device.

At step 345, on the other hand, if, at step 330, it was determined that user data matches certain electronic program guide content information, then a user-targeted content item description can be generated from at least one of the different, alternative content descriptions of a content item, based on the above comparing at step 325. As one example, the user-targeted content item description can be generated from one specific one of the different, alternative content descriptions of a given content item based on the comparing that was performed at step 325. As another example, the user-targeted content item description can be generated from an amalgamation of some or all of two or more of the different, alternative content descriptions of a given content item based on the comparing that was performed at step 325. The content presentation device can generate the user-targeted content item description from the different, alternative content descriptions to update the content description in a visual electronic program guide so it is specific to a particular user. This can drive more user engagement towards content items, which is beneficial to both users and content providers. The user-targeted content item description includes at least one of the different, alternative content descriptions of the given content item and excludes at least one other of the alternative content descriptions based on the comparing of the electronic program guide content information with the user data. For example, the user-targeted content item description can include one entire one of the alternative content item descriptions and can exclude other alternative descriptions for that same content item. As another example, the user-targeted content item description can include other sentences, words, sets, or subsets of one or more of the different, alternative content descriptions while excluding other sentences, words, sets, or subsets of others of the different, alternative content descriptions.

At 350, a visual electronic program guide can be displayed to a user on the physical display device, where the electronic program guide can include the user-targeted content item description. The user-targeted content item description may or may not be displayed in response to receiving user input selecting specific content on the visual electronic program guide. Also, the displayed visual electronic program guide may or may not prioritize displaying content with user-targeted content item descriptions over content without user-targeted content item description. Additionally, shows with descriptions that highlight advertising sponsorship of a user's favorite brands can be prioritized in the electronic program guide. Furthermore, a user-targeted content item description can be generated based on a user's preference in brands. For example, if a user prefers a certain brand of soft drink, and the soft drink sponsors a television show, the content item description can highlight the fact that the user's favorite soft drink sponsors the show.

According to one aspect, one of the alternative content item descriptions can be selected wholesale as the user-targeted content item description, based on comparing the electronic program guide content information with the user data. According to another aspect, to generate the user-targeted content item description, at least one of the different, alternative content item descriptions of a given content item can be selected and can then be combined with at least some of other content description information to generate the user-targeted content item description. For example, a description template can be used for the user-targeted content item description and different fields can be populated in the template from the different, alternative content descriptions based on user preferences. By way of a specific example, a user may enjoy movies that include a particular actor and a description template can include a field that can highlight the fact that the particular actor is in the corresponding movie. Additionally, multiple different, alternative content descriptions can be pieced together to create the user-targeted content item description. These content descriptions can be dynamically changed to increase the propensity of a user to watch the corresponding content if they so choose to.

The operations of the flowchart 300 can be performed for different users when different users access the electronic program guide. Thus, different user-targeted content item descriptions can be generated for different users depending on which user is accessing the content presentation device, which user is logged into the device, which user the content presentation detects is present in a room, which user's profile is in use or is selected, or depending on any other operation of determining which user's profile is appropriate. At step 355, the relevant processing of the exemplary flow diagram 300 can end.

Figure 4:
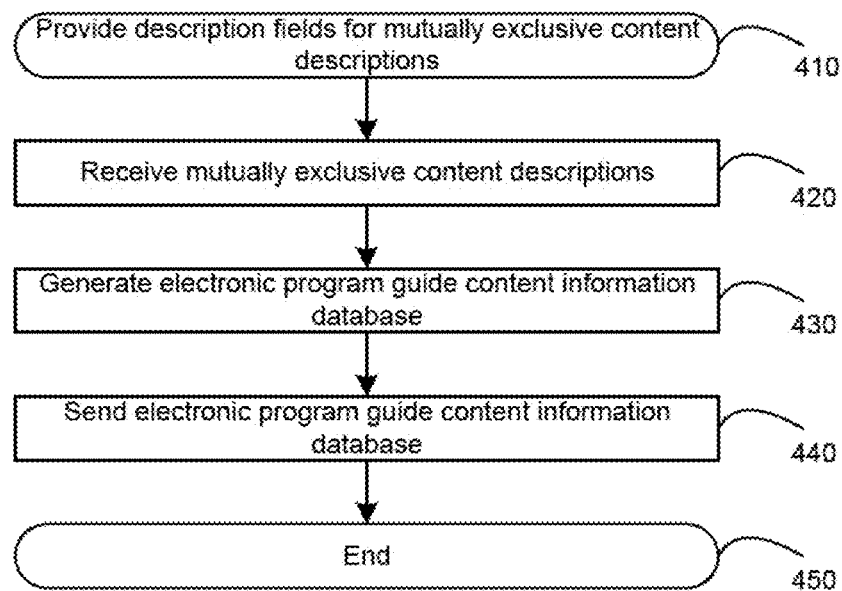
FIG. 4 is an exemplary flow diagram illustrating operation of an electronic program guide information server for increasing user interaction performance.

Turning to FIG. 4, an exemplary flow diagram 400 is shown therein, illustrating an exemplary operation of the electric program guide source computing device 190 (shown in FIG. 1) for increasing user efficiency and interaction performance. In operation of the flow diagram 400, the electric program guide source computing device 190 can employ similar components of the content presentation device 200 that was illustrated in FIG. 2. Initially, at step 410, description fields, templates or other like structures can be provided to enable content providers, or other entities affiliated with a particular content item, to provide different, alternative content descriptions of a content item. At step 420, different, alternative content descriptions can be received, such as in accordance with the fields, templates or the like provided at step 410. For example, a content provider, or other source of content descriptions, can generate multiple different content descriptions for a single content item, where each content description can be written to appeal to different user preferences. As such, according to one aspect, the description fields, templates or the like can correspond to different types of users, such as generalized buckets of users, where each different type can be a different persona that a content information author can generate a content description towards. Appropriate labeling, or other like metadata, can indicate what types of users the field relates to. To determine user types that content descriptions can be written for, users can be bucketized into different groups based on the user data associated with each user. For example, users who often watch action films can be grouped together and content descriptions can be created and provided based on their propensity to watch action films. Similarly, users who often watch romance films can be grouped together and content descriptions can be created and provided accordingly. According to another aspect, however, multiple fields, templates or other like divisions can be generated, such as at step 410, as generic containers for alternative content descriptions. Individual content description authors, such as content providers, can generate multiple different, alternative content item descriptions, with each such description being provided via one of the multiple fields. The content description authors can, further, provide a categorization, or other like metadata delineating various user aspects, or types of users, to which each specific alternative content item description is directed.

Returning to the exemplary flow diagram 400 of FIG. 4, at step 430, an electronic program guide content information database can be generated. The electronic program guide content information database can comprise the different, alternative content descriptions that were received at step 420. At 440, the electronic program guide content information database can be provided to the content presentation device to display an electronic program guide, including the electronic program guide content information, on a physical display device. The electronic program guide content information database can comprise fields or divisions that can be utilized to generate user-targeted content item descriptions from selected portions of alternative content descriptions of the content item. At step 450, the relevant processing of the exemplary flow diagram 400 can end.

Figure 5:
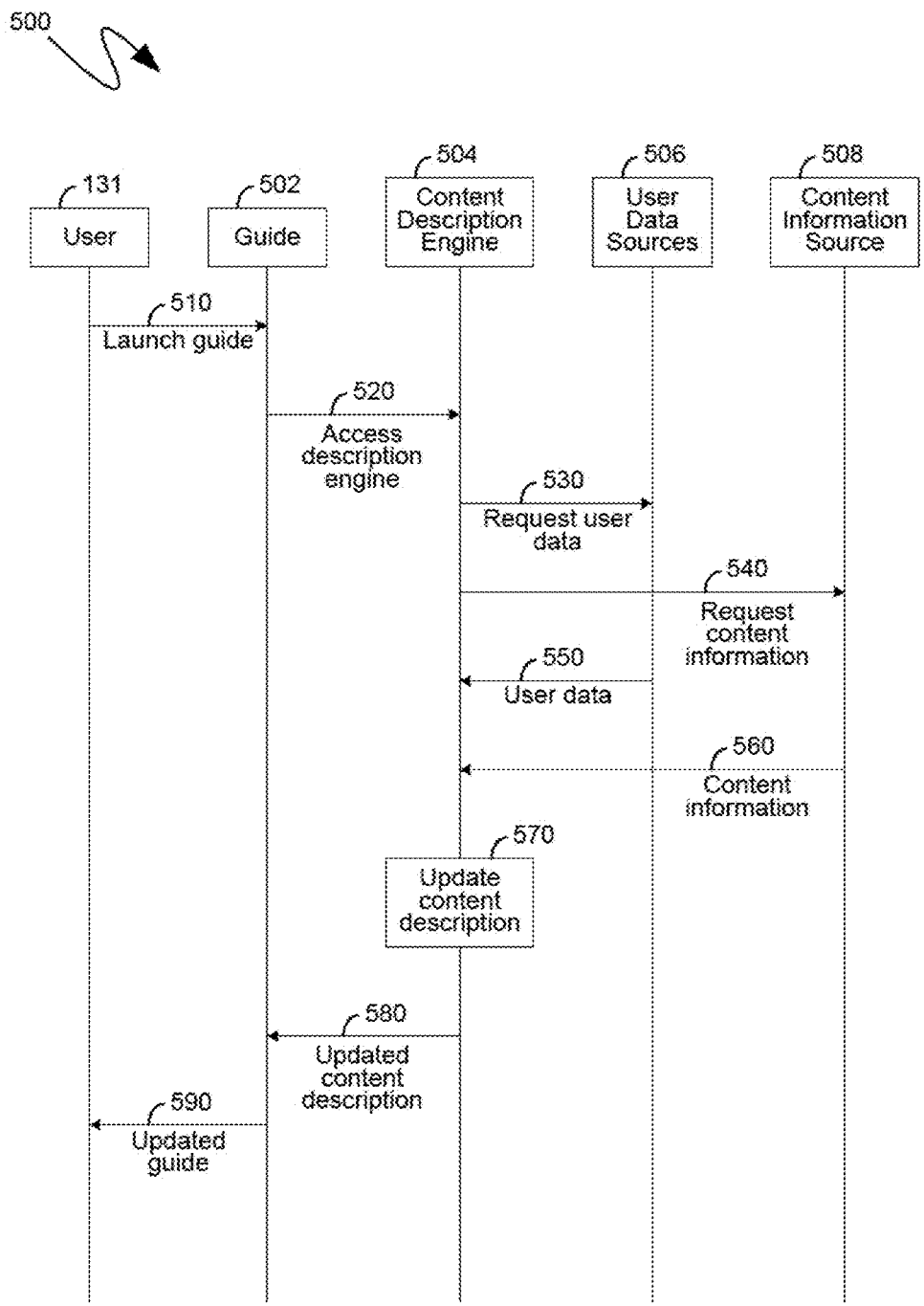
FIG. 5, is an exemplary signal flow diagram illustrating an exemplary operation of a system for increasing user interaction performance.

Turning to FIG. 5, an exemplary communicational diagram 500 is shown therein, illustrating an exemplary operation of a system, such as the exemplary system 100 (shown in FIG. 1), for increasing user efficiency and interaction performance. The signal flow diagram 500 illustrates communications between various conceptual entities, which can be implemented within a single computing device, or across multiple computing devices, with each of the multiple computing devices hosting, or providing for, at least one of the illustrated conceptual entities. Initially, represented by the communication 510, the user 131 can launch an electronic program guide application 502 that can operate within the context of, or separately from, the content presentation application 185 on the content presentation device 110 of FIG. 1. For example, the user 131 can utilize a user input device, such as those described in detail above, to access the electronic program guide application 502. As indicated previously, the electronic program guide application 502 can be a television program guide, a movie program guide, a movie or game marketplace or store, a streaming video application, or any other application that provides content descriptions for content.

Represented by the communication 520, the electronic program guide application 502 can access, or make a request to, a content description engine 504. Such a content description engine 504 can operate within the context of the content presentation application 185 of FIG. 1, or it can operate separately therefrom, including being executed by separate computing devices. The communication 530 can represent the content description engine 504 requesting user data from user data sources 506. Such user data sources 506 can be local to the computing device being utilized by the user, such as the exemplary content presentation device 200 (shown in FIG. 2). Alternatively, or in addition, one or more remote computing devices can also comprise components of the user data sources 506. User data sources 506 can include single files, separate databases, application data, and other sources of user data that can provide information for creating user-targeted content item descriptions. As discussed above, the user data can include user behavior data, user profile data, a current expression of one or more users, a number of people currently in a room, user biometric data, and the other data discussed above. As a further possible example, the content description engine 504 can obtain the user data from a content presentation device knowledge services platform.

Communication 540 can represent the content description engine 504 requesting content information about the content that is accessed by, or incorporated into, the electronic program guide application 502. Such a request, represented by the communication 540, can be to one or more content information sources, such as the electronic program guide source computing device 190 of FIG. 1. For example, one content information source 508 can be a content originator. As another example, such as for live television, another content information source 508 can be a third party service. As yet another example, content descriptions can be provided by content information sources 508 in the form of content providers.

Communication 550 can represent the user data sources 506 providing the user data to the content description engine. Analogously, communication 560 can represent the content information sources 508 provide content information to the content description engine 504. While illustrated as being causally connected in the exemplary system 500 of FIG. 5, communications 530, 540, 550, and 560 need not be performed in any particular order. For example, the requests 530 and 540 can be made concurrently or at different times and the responses 550 and 560 can also be provided concurrently or at different times.

Communication 570 can represent the content description engine 504 updating content descriptions, leveraging both user data and available content data to generate user-targeted content item descriptions. Such updated content descriptions can be communicated, as illustrated by the communication 580, from the content description engine 504 to the electronic program guide application 502. Subsequently, as represented by the communication 590, the electronic program guide application 502 can display, to the user 131, the user-targeted content item descriptions corresponding to one or more content items.

Figure 6:
FIG. 6, is an exemplary electronic program guide illustrating a selected content item and a corresponding content item description targeted to a first user to help improve usability and accessibility of content items.

Turning to FIG. 6, an exemplary electronic program guide 600 is shown therein, illustrating a selected content item 620 and a corresponding content item description 610 targeted to a first user to help improve usability and accessibility of content items. The electronic program guide 600 can be displayed by the content presentation device 110 on the display device 120 of FIG. 1. The content item description 610 can be a user-targeted content item description that is targeted to the specific user interacting with the illustrated exemplary electronic program guide 600. For example, the content item description 610 can describe the exemplary Space Wars content as an action-adventure starring Garrison Gord based on user data that is indicative of, for example, a user who enjoys action movies, or a user who is favorably disposed towards content featuring Garrison Gord.

Figure 7:
FIG. 7, is an exemplary electronic program guide illustrating a selected content item and a corresponding content item description targeted to a second user to help improve usability and accessibility of content items.

Turning to FIG. 7, the exemplary electronic program guide 600 of FIG. 6 is shown therein, illustrating the same selected content item 620, except now providing a different content item description 710 that can be targeted to a different user to help improve usability and accessibility of content items. The different content item description 710 can describe the same exemplary Space Wars content as being a romantic adventure starring Mary Misher based on user data that indicative of, for example, a user who enjoys romance movies, or a user who is favorably disposed towards content featuring Mary Misher.

FIGS. 6 and 7 illustrate exemplary electronic program guides where the user-targeted content item descriptions can be wholesale selected from among two or more different, alternative content item descriptions. However, as indicated previously, content item descriptions can be piecemeal selected to construct a user-targeted content item description. For example, a content item description can have discrete portions of it identified as being interchangeable with discrete portions of other content item descriptions. As another example, heuristic analysis can identify portions of content item descriptions that can be linguistically interchangeable. For example, within the specific exemplary context established by the exemplary electronic program guides 600 and 700, the phrase "starring Garrison Gord as a swashbuckling space pirate" from the exemplary content item description 610 can be identified as being interchangeable with the phrase "starring Mary Misher as a princess of another world" from the exemplary, alternative content item description 710. Consequently, if the user data is indicative of a user who enjoys both action movies and movies starring Mary Misher, user-targeted content item description can be generated by combining aspects of the alternative content item descriptions 610 and 710 that appeal to the user. For example, within the above specific exemplary context, an exemplary user-targeted content item description for a user who enjoys both action movies and movie starring Mary Misher, can be generated to read "a futuristic action adventure starring Mary Misher as a princess of another world who saves a planet from certain destruction; also starring Garrison Gord and Mark Mammil." Other like permutations could equally be generated from identified component parts of different, alternative content item descriptions.

The aspects described above include, as a first example, a content presentation device for increasing user interaction performance, the content presentation device comprising: one or more processing units that execute computer-executable instructions; a graphics hardware interface communicationally coupling the content presentation device to a physical display device such that the computer-executable instructions being executed by the one or more processing units cause physical changes to the physical display device, thereby generating display content on the physical display device; and a content presentation application comprising computer-executable instructions which, when executed by at least some of the one or more processing units, cause the content presentation device to perform steps comprising: receiving electronic program guide content information, the electronic program guide content information comprising two or more different, alternative content descriptions of a same first content item; comparing the two or more different, alternative content descriptions with user data; generating a user-targeted content item description of the first content item from at least a portion of at least one of the different, alternative content descriptions of the first content item based on the comparing of the two or more different, alternative content descriptions with the user data; and generating, on the physical display device, a display of an electronic program guide, the display comprising the generated user-targeted content item description.

A second example is the content presentation device of the first example, wherein the two or more different, alternative content descriptions of the same first content item are mutually exclusive of each other such that generating the user-targeted content item description from the at least a portion of the at least one of the different, alternative content descriptions necessarily excludes generation of the user-targeted content item description from any other of the different, alternative content descriptions.

A third example is the content presentation device of the first example, wherein a first of the two or more different, alternative content descriptions is directed to a first descriptive aspect of the first content item and a second of the two or more different, alternative content descriptions is directed to a second descriptive aspect of the first content item, the second descriptive aspect differing from the first descriptive aspect.

A fourth example is the content presentation device of the third example, wherein the first descriptive aspect is a first genre to which the first content item is described as belonging by the first of the two or more different, alternative content descriptions and the second descriptive aspect is a second genre, different than the first genre, to which the first content item is also described as belonging by the second of the two or more different, alternative content descriptions.

A fifth example is the content presentation device of the first example, wherein the generating the display of the electronic program guide is performed after, and in response to, receiving user input selecting the first content item.

A sixth example is the content presentation device of the first example, wherein the user data comprises at least one user content preference; and wherein further the comparing the two or more different, alternative content descriptions with user data comprises identifying the at least a portion of the at least one of the different, alternative content descriptions that is associated with the user content preference.

A seventh example is the content presentation device of the first example, wherein the generating the user-targeted content item description comprises selecting all of a single content description, from among the different, alternative content descriptions, as the user-targeted content item description.

An eighth example is the content presentation device of the first example, wherein the generating the user-targeted content item description comprises generating the user-targeted content item description from only a first portion of a first content description from among the different, alternative content descriptions and from only a first portion of a second, different content description from among the different, alternative content descriptions.

A ninth example is the content presentation device of the eighth example, wherein the first portion of the first content description was identified as being separable from remaining portions of the first content description; and wherein further the first portion of the second content description was identified as being separable from remaining portions of the second content description.

A tenth example is the content presentation device of the first example, wherein the content presentation application comprises further computer-executable instructions which, when executed by the one or more processing units, cause the content presentation device to perform steps comprising: determining that a second user, different from a user for whom the user-targeted content was generated, is utilizing the electronic program guide; comparing the two or more different, alternative content descriptions with a second user data, different from the user data; generating a second user-targeted content item description of the first content item from at least a portion of at least one of the different, alternative content descriptions of the first content item based on the comparing of the two or more different, alternative content descriptions with the second user data; and generating, on the physical display device, a subsequent display of the electronic program guide, the subsequent display comprising the generated user-targeted content item description.

An eleventh example is the content presentation device of the first example, wherein the generating the user-targeted content item description of the first content item comprises utilizing a default content item description, received with the electronic program guide content information, for the first content item, if none of the two or more different, alternative content descriptions match the user data.

A twelfth example is an electronic program guide information server for increasing user interaction performance, the content presentation device comprising: one or more processing units that execute computer-executable instructions; a network interface communicationally coupling the electronic program guide information server to a content presentation device such that the content presentation device causes physical changes to a physical display device coupled to the content presentation device, thereby generating display content on the physical display device; and an electronic program guide content information application comprising computer-executable instructions which, when executed by at least some of the one or more processing units, cause the electronic program guide information server to perform steps comprising: providing fields for different, alternative content descriptions of a same first content item; receiving, different, alternative content descriptions for the first content item; generating electronic program guide content information comprising the different, alternative content descriptions; and transmitting the electronic program guide content information to the content presentation device to display an electronic program guide, comprising user-targeted content item descriptions, generated from at least a portion of at least one of the different, alternative content descriptions, on the physical display device.

A thirteenth example is the electronic program guide information server of the twelfth example wherein the provided fields individually comprise an entire one of the different, alternative content descriptions for the first content item.

A fourteenth example is the electronic program guide information server of the twelfth example, wherein the content description category comprises a category for an entire content description of a content item wherein the wherein the provided fields are associated with predefined categories of content descriptions.

A fifteenth example is the electronic program guide information server of the thirteenth example, wherein at least two of the provided fields are mutually exclusive of each other, such that a first description, from among the received different, alternative content descriptions for the first content item, associated with a first one of the at least two provided fields is mutually exclusive of a second description, from among the received different, alternative content descriptions for the first content item, that is associated with a second one of the at least two provided fields.

A sixteenth example is user-targeted content item description server that serves user-targeted content item descriptions for an electronic program guide, the user-targeted content item description server comprising: one or more processing units that execute computer-executable instructions; a network interface communicationally coupling the content server to a content presentation device such that the content presentation device causes physical changes to a physical display device coupled to the content presentation device, thereby generating display content on the physical display device; and a user-targeted content item description generation application comprising computer-executable instructions which, when executed by at least some of the one or more processing units, cause the user-targeted content item description server to perform steps comprising: receiving electronic program guide content information, the electronic program guide content information comprising two or more different, alternative content descriptions of a same first content item; comparing the two or more different, alternative content descriptions with user data; generating a user-targeted content item description of the first content item from at least a portion of at least one of the different, alternative content descriptions of the first content item based on the comparing of the two or more different, alternative content descriptions with the user data; and transmitting the user-targeted content item description over the network interface to the content presentation device to display an electronic program guide, comprising the transmitted user-targeted content item descriptions, on the physical display device.

A seventeenth example is the user-targeted content item description server of the sixteenth example, wherein the user-targeted content item description generation application comprises further computer-executable instructions which, when executed by at least some of the one or more processing units, cause the user-targeted content item description server to perform further steps comprising: providing fields for the different, alternative content descriptions of the first content item; and wherein further the receiving the electronic program guide content information is in accordance with the provided fields.

An eighteenth example is the user-targeted content item description server of the sixteenth example, wherein the generating the user-targeted content item description comprises selecting all of a single content description, from among the different, alternative content descriptions, as the user-targeted content item description.

A nineteenth example is the user-targeted content item description server of the sixteenth example, wherein the generating the user-targeted content item description comprises generating the user-targeted content item description from only a first portion of a first content description from among the different, alternative content descriptions and from only a first portion of a second, different content description from among the different, alternative content descriptions.

A twentieth example is the user-targeted content item description server of the nineteenth example, wherein the first portion of the first content description was identified as being separable from remaining portions of the first content description; and wherein further the first portion of the second content description was identified as being separable from remaining portions of the second content description.

As can be seen from the above descriptions, mechanisms for increasing user interaction performance with a content presentation device have been presented. In view of the many possible variations of the subject matter described herein, we claim as our invention all such embodiments as may come within the scope of the following claims and equivalents thereto.

We claim:

1. A content presentation device for increasing user interaction performance, the content presentation device comprising:
 one or more processing units that execute computer-executable instructions;
 a graphics hardware interface communicationally coupling the content presentation device to a physical display device such that the computer-executable instructions being executed by the one or more processing units cause physical changes to the physical display device, thereby generating display content on the physical display device; and
 a content presentation application comprising computer-executable instructions which, when executed by at least some of the one or more processing units, cause the content presentation device to perform steps comprising:
  receiving electronic program guide content information, the electronic program guide content information comprising two or more different, alternative content descriptions of a same first content item;
  comparing the two or more different, alternative content descriptions with user data;
  generating a user-targeted content item description of the first content item from at least a portion of at least one of the different, alternative content descriptions of the first content item based on the comparing of the two or more different, alternative content descriptions with the user data; and
  generating, on the physical display device, a display of an electronic program guide, the display comprising the generated user-targeted content item description.

2. The content presentation device of claim 1, wherein the two or more different, alternative content descriptions of the same first content item are mutually exclusive of each other such that generating the user-targeted content item description from the at least a portion of the at least one of the different, alternative content descriptions necessarily excludes generation of the user-targeted content item description from any other of the different, alternative content descriptions.

3. The content presentation device of claim 1, wherein a first of the two or more different, alternative content descriptions is directed to a first descriptive aspect of the first content item and a second of the two or more different, alternative content descriptions is directed to a second descriptive aspect of the first content item, the second descriptive aspect differing from the first descriptive aspect.

4. The content presentation device of claim 3, wherein the first descriptive aspect is a first genre to which the first content item is described as belonging by the first of the two or more different, alternative content descriptions and the second descriptive aspect is a second genre, different than the first genre, to which the first content item is also described as belonging by the second of the two or more different, alternative content descriptions.

5. The content presentation device of claim 1, wherein the generating the display of the electronic program guide is performed after, and in response to, receiving user input selecting the first content item.

6. The content presentation device of claim 1, wherein the user data comprises at least one user content preference; and wherein further the comparing the two or more different, alternative content descriptions with user data comprises identifying the at least a portion of the at least one of the different, alternative content descriptions that is associated with the user content preference.

7. The content presentation device of claim 1, wherein the generating the user-targeted content item description comprises selecting all of a single content description, from among the different, alternative content descriptions, as the user-targeted content item description.

8. The content presentation device of claim 1, wherein the generating the user-targeted content item description comprises generating the user-targeted content item description from only a first portion of a first content description from among the different, alternative content descriptions and from only a first portion of a second, different content description from among the different, alternative content descriptions.

9. The content presentation device of claim 8, wherein the first portion of the first content description was identified as being separable from remaining portions of the first content description; and wherein further the first portion of the second content description was identified as being separable from remaining portions of the second content description.

10. The content presentation device of claim 1, wherein the content presentation application comprises further computer-executable instructions which, when executed by the one or more processing units, cause the content presentation device to perform steps comprising:
   determining that a second user, different from a user for whom the user-targeted content was generated, is utilizing the electronic program guide;
   comparing the two or more different, alternative content descriptions with a second user data, different from the user data;
   generating a second user-targeted content item description of the first content item from at least a portion of at least one of the different, alternative content descriptions of the first content item based on the comparing of the two or more different, alternative content descriptions with the second user data; and
   generating, on the physical display device, a subsequent display of the electronic program guide, the subsequent display comprising the generated user-targeted content item description.

11. The content presentation device of claim 1, wherein the generating the user-targeted content item description of the first content item comprises utilizing a default content item description, received with the electronic program guide content information, for the first content item, if none of the two or more different, alternative content descriptions match the user data.

12. A method of increasing user interaction performance with a content presentation device comprising one or more processing units performing the steps of the method, the method comprising:
   receiving, by the content presentation device, electronic program guide content information, the electronic program guide content information comprising two or more different, alternative content descriptions of a same first content item;
   comparing, on the content presentation device, the two or more different, alternative content descriptions with user data;
   generating, by the content presentation device, a user-targeted content item description of the first content item from at least a portion of at least one of the different, alternative content descriptions of the first content item based on the comparing of the two or more different, alternative content descriptions with the user data; and
   generating, on a physical display device communicationally coupled to the content presentation device, a display of an electronic program guide, the display comprising the generated user-targeted content item description.

13. The method of claim 12, wherein a first of the two or more different, alternative content descriptions is directed to a first descriptive aspect of the first content item and a second of the two or more different, alternative content descriptions is directed to a second descriptive aspect of the first content item, the second descriptive aspect differing from the first descriptive aspect.

14. The method of claim 12, wherein the user data comprises at least one user content preference; and wherein further the comparing the two or more different, alternative content descriptions with user data comprises identifying the at least a portion of the at least one of the different, alternative content descriptions that is associated with the user content preference.

15. The method of claim 12, wherein the generating the user-targeted content item description comprises generating the user-targeted content item description from only a first portion of a first content description from among the different, alternative content descriptions and from only a first portion of a second, different content description from among the different, alternative content descriptions.

16. The method of claim 12, further comprising:
   determining, by the content presentation device, that a second user, different from a user for whom the user-targeted content was generated, is utilizing the electronic program guide;
   comparing, at the content presentation device, the two or more different, alternative content descriptions with a second user data, different from the user data;
   generating, at the content presentation device, a second user-targeted content item description of the first content item from at least a portion of at least one of the different, alternative content descriptions of the first content item based on the comparing of the two or more different, alternative content descriptions with the second user data; and
   generating, on the physical display device, a subsequent display of the electronic program guide, the subsequent display comprising the generated user-targeted content item description.

17. One or more computer-readable storage media comprising computer-executable instructions which, when executed by one or more processing units of a content presentation device, cause the content presentation device to:
   receive electronic program guide content information, the electronic program guide content information comprising two or more different, alternative content descriptions of a same first content item;
   compare the two or more different, alternative content descriptions with user data;
   generate a user-targeted content item description of the first content item from at least a portion of at least one of the different, alternative content descriptions of the first content item based on the comparing of the two or more different, alternative content descriptions with the user data; and
   generate, on a physical display device communicationally coupled to the content presentation device, a display of an electronic program guide, the display comprising the generated user-targeted content item description.

18. The computer-readable storage media of claim 17, wherein a first of the two or more different, alternative content descriptions is directed to a first descriptive aspect of the first content item and a second of the two or more different, alternative content descriptions is directed to a second descriptive aspect of the first content item, the second descriptive aspect differing from the first descriptive aspect.

19. The computer-readable storage media of claim 17, wherein the generating the user-targeted content item description comprises generating the user-targeted content item description from only a first portion of a first content description from among the different, alternative content descriptions and from only a first portion of a second, different content description from among the different, alternative content descriptions.

20. The computer-readable storage media of claim 17, comprising further computer-executable instructions which, when executed by the one or more processing units, cause the content presentation device to:
- determine that a second user, different from a user for whom the user-targeted content was generated, is utilizing the electronic program guide;
- compare the two or more different, alternative content descriptions with a second user data, different from the user data;
- generate a second user-targeted content item description of the first content item from at least a portion of at least one of the different, alternative content descriptions of the first content item based on the comparing of the two or more different, alternative content descriptions with the second user data; and
- generate, on the physical display device, a subsequent display of the electronic program guide, the subsequent display comprising the generated user-targeted content item description.

\* \* \* \* \*